April 25, 1933.    J. P. FERRIS ET AL    1,905,164
BROACHING MACHINE
Original Filed Dec. 18, 1929    4 Sheets-Sheet 1

INVENTORS
JOHN P. FERRIS.
WALTER FERRIS.
BY Wesley Merrill
ATTORNEY.

April 25, 1933.  J. P. FERRIS ET AL  1,905,164
BROACHING MACHINE
Original Filed Dec. 18, 1929    4 Sheets-Sheet 2

Fig. 2.

INVENTORS
JOHN P. FERRIS.
WALTER FERRIS.
BY Wesley Merrill
ATTORNEY.

April 25, 1933.   J. P. FERRIS ET AL   1,905,164
BROACHING MACHINE
Original Filed Dec. 18, 1929   4 Sheets-Sheet 3

INVENTORS
JOHN P. FERRIS.
WALTER FERRIS.
BY
ATTORNEY.

April 25, 1933. J. P. FERRIS ET AL 1,905,164
BROACHING MACHINE
Original Filed Dec. 18, 1929  4 Sheets-Sheet 4

Fig. 5

INVENTORS
JOHN P. FERRIS.
WALTER FERRIS.
BY
ATTORNEY.

Patented Apr. 25, 1933

1,905,164

UNITED STATES PATENT OFFICE

JOHN P. FERRIS, OF WHITEFISH BAY, AND WALTER FERRIS, OF MILWAUKEE, WISCONSIN, ASSIGNORS TO THE OILGEAR COMPANY, OF MILWAUKEE, WISCONSIN, A CORPORATION OF WISCONSIN

BROACHING MACHINE

Original application filed December 18, 1929, Serial No. 414,905. Divided and this application filed November 9, 1931. Serial No. 573,928.

This application is a division of application Serial No. 414,905 which was filed December 8, 1929.

The invention relates to a broaching machine of the type having a tool head for carrying a broaching tool, tool handling mechanism for moving a broaching tool into and out of engagement with the tool head, a support or pressure plate for receiving the thrust of the work, and power means for producing relative reciprocation between the tool head and the work support.

An object is to provide a broaching machine which is fully automatic in operation.

Another object is to provide a broaching machine which will come to rest automatically at the end of a complete cycle of operation or will operate continuously until stopped by the operator.

Another object is to provide means for enabling the operator to assume control of the machine at any point in a cycle of operation.

Another object is to provide a broaching machine in which the several mechanisms operate in a fixed and predetermined sequence.

A machine constructed according to the invention may be operated at high speed and succeeding cycles may be completed in rapid succession.

Other objects and advantages will appear hereinafter.

According to the invention in one of its aspects, the several mechanisms are so interlocked that one must substantially complete its operation before another can operate.

According to the invention in another aspect, the broaching tool is locked to the tool head in response to the entry of the tool therein.

According to the invention in another aspect, the machine is operated hydraulically and has certain pistons and cylinders which function as both motors and valves.

The invention is embodied in the broaching machine illustrated in the accompanying drawings in which the views are as follows.

The broaching machine has its mechanism carried by a frame or housing 10 which is supported at its front upon two pedestals 11 and at its rear upon two pedestals 12.

The pedestals 11 and 12 are carried by a base 13 which has upwardly extending edges and functions as a catch basin.

The front pedestals 11 also have a crosshead 14 secured to the tops thereof, and a vertical cylinder 15 is arranged upon each end of the crosshead 14 and has its lower end secured thereto.

The crosshead 14 has a drawhead 16 secured therein intermediate the cylinders 15 and provided with a socket 17 to receive the nose 18 of a broaching tool 19 which has an annular groove 20 formed therein.

The socket 17 is intersected by two slots 21 which are formed diametrically opposite each other in the side walls of the drawhead 16, and the distance between the slots 21 is substantially equal to the diameter of the nose 18 at the bottom of the groove 20.

The broaching tool 19 is adapted to be locked in the socket 17 by a locking bar 22 having its head 23 bifurcated by a slot 24 and arranged in the slots 21 to reciprocate therein.

The side walls of the slot 24 along the inner part thereof engage the bottom of the slot 21, and the outer part of the slot 24 has sufficient width to allow the nose 18 to pass therethrough.

Figure 4:
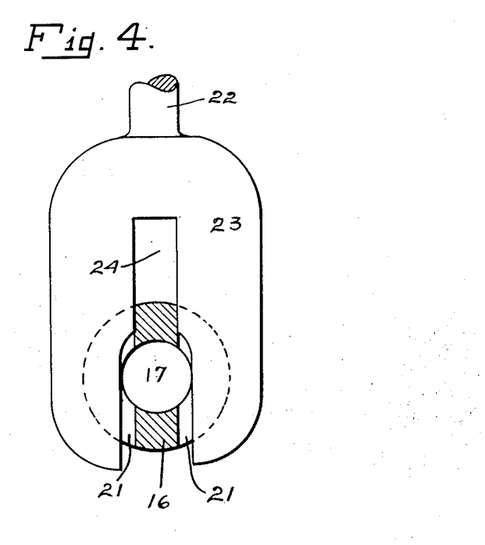
Fig. 4 is a section on the line 4—4 of Fig. 1.

The head 23 of the locking bar 22 is initially in the position shown in Fig. 4, and the nose 18 of the tool 19 may be advanced into the socket 17 until the groove 20 is in alinement with the slot 21. Then the locking bar 22 is advanced and the metal along each side of the slot 24 at the inner part thereof enters the groove 20 and functions as keys to lock the tool 19 to the drawhead 16.

The locking bar 22 is advanced and retracted by a piston 25 which is connected thereto and arranged in a cylinder 26 secured in a stationary position within the frame 10.

Each of the cylinders 15 has a piston 27 fitted therein and connected by a piston rod 28 to a work support which is substantially U-shaped in vertical section and is formed primarily by a horizontal bottom or pressure plate 29 and two vertical side members 30 which are connected to the bottom plate upon opposite sides thereof.

Each side member 30 is angular in horizontal section and has its two legs connected to each other at the upper ends thereof by a horizontal flange 31 which extends over the top of a cylinder 15 and has the piston rod 28 attached thereto.

The bottom plate 29 is connected to the side members 30 near the lower ends thereof and supports the work at a convenient height from the floor when the work support is in its lower position as shown in the drawings.

Each side member is provided upon its rear leg with an upper shoe 32 and a lower shoe 33 both of which extend rearwardly therefrom and are fitted for vertical reciprocation upon a guide plate 34 one of which is fastened to the frame 10 upon each side thereof to hold the work support against lateral movement.

The bottom plate 29 is provided at approximately its center with an opening 35, which permits the broaching tool 19 to pass therethrough, and along its rear edge with a wide flange 36 which reinforces it and prevents chips from falling rearwardly onto the working parts of the machine.

In operating the machine, a piece of work "A" is placed upon the bottom plate 29 in registry with the opening 35, the tool 19 is passed through the work and through the opening 35 into the socket 17 and fastened therein by the locking bar 22, and then liquid is supplied to the lower ends of the cylinders 15 to raise the pistons 27 and thereby raise the work support and pass the work "A" over the tool.

Liquid is delivered to the cylinders 15 from a variable displacement reversible flow pump 37, such as the pump disclosed in Patent No. 1,798,198 issued March 31, 1931 to Walter Ferris and John P. Ferris.

This pump is driven at a constant speed from an outside source, as by means of the pulley 38, and it delivers liquid through either a pipe 39 or a pipe 40 depending upon the position of a control lever 41 which controls the displacement of the pump 37 and the direction of liquid flow.

The pipe 39 is connected to the lower ends of the cylinders 15 by branch pipe 42, and the pipe 40 is connected to the upper ends of the cylinders 15 by branch pipes 43.

Figure 5:
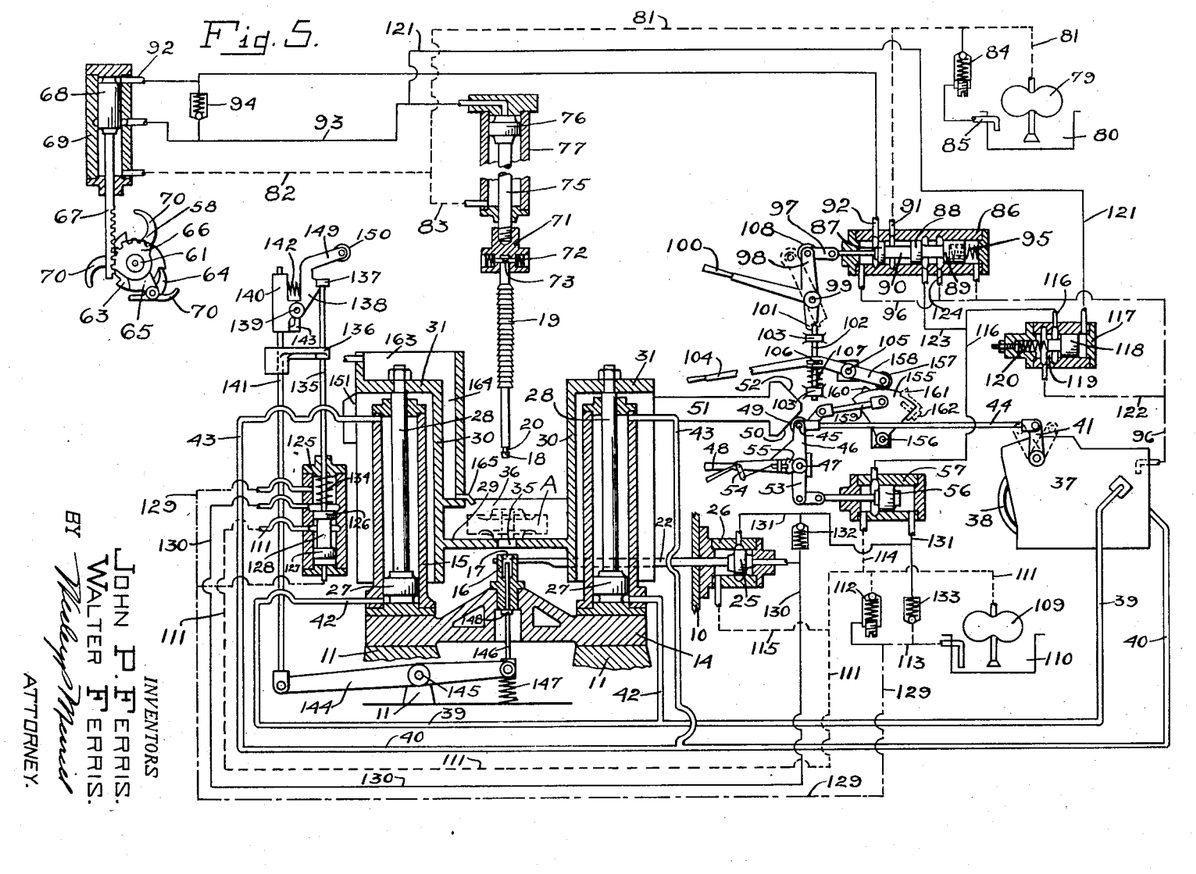
Fig. 5 is a schematic drawing of the hydraulic circuit and shows the plungers of the several valves in the positions occupied when the machine is idle.

When the control lever 41 is swung to the right into the position shown in dotted lines in Fig. 5, the pump 37 delivers liquid at its full capacity through the pipes 39 and 42 to the lower ends of the cylinders 15 to raise the pistons 27, and the liquid exhausted from the upper ends of the cylinders 15 is returned to the pump 37 through the pipes 43 and 40.

When the control lever 41 is swung to the left into the position shown in dotted lines in Fig. 5, the pump 37 delivers liquid at its full capacity through the pipes 40 and 43 to the upper ends of the cylinders 15 to lower the pistons 27, and the liquid exhausted from the lower ends of the cylinders 15 is returned to the pump 37 through the pipes 42 and 39.

If the lever 41 is swung a shorter distance in either direction, the pump 37 delivers a more limited volume of liquid corresponding to the positions of the lever.

The pump 37 is controlled both manually and automatically through a link 44 which has one of its ends pivoted to the outer end of the lever 41 and its other end connected by a pin 45 to one arm of a bell crank lever 46.

The bell crank lever 46 is pivoted upon a trunnion 47 carried by the frame 10, and its other arm is elongated to provide a handle 48 for controlling the pump 37 manually.

The pin 45 also carries a roller 49 to engage an inclined face 50 of a cam 51 which is carried by one of the side members 30 and provided with another inclined face 52.

The cam face 50 engages the roller 49 and shifts the lever 41 into its neutral position as the work support 29 approaches the limit of its downward movement.

The trunnion 47 also has a lever 53 pivoted thereon and normally fixed for rotation with the bell crank lever 46 by a spring pressed latch 54 which is carried thereby and is normally in engagement with a notched quadrant 55 fixed upon the lever 53.

The free end of the lever 53 is connected to a piston 56 which is arranged in a cylinder 57 carried by the frame 10. Liquid delivered to the cylinder 57 will cause the piston 56 to rock the levers 53 and 46 upon the trunnion 47 and thereby shift the lever 41 to vary the displacement of the pump 37.

In order to control the pump 37 without shifting the piston 56, the latch 54 is operated to withdraw it from engagement with the quadrant 55 and allow the bell crank lever 46 to rock upon the trunnion 47 independently of the lever 53.

The work "A" is moved into and out of position to be broached by a star wheel 58 fixed upon the lower part of a vertical shaft 59 which is journaled at its lower end in a bearing 60 carried by the work support and arranged upon the underside of the bottom plate 29 in front of the opening 35.

The upper part of the shaft 59 is fitted within a hollow shaft 61 and splined thereto to allow it to slide vertically therein as the work support is raised and lowered.

The shaft 61 is journaled in a bearing 62 carried by the frame 10, and it is provided at its upper end with a three-toothed ratchet wheel 63 through which the shafts 59 and 61 and the star wheel 58 are rotated intermittently.

The teeth of the ratchet wheel 63 are engaged in succession by a pawl 64 pivoted upon an arm 65 which projects radially from a segmental gear 66 journaled upon the upper end of the shaft 61.

The segmental gear 66 meshes with a rack 67 having its rear end connected to the rod of a piston 68 which is fitted in a cylinder 69 secured to the top of the frame 10.

Liquid delivered to the rear end of the cylinder 69 will advance the rack 67 and rotate the ratchet wheel 63, the shafts 59 and 61 and the star wheel 58 through an angle of 120°, and liquid delivered to the front end of the cylinder 69 will retract the rack 67 and rotate the segmental gear 66 in the opposite direction to move the pawl 64 behind the next tooth on the ratchet wheel 63.

The star wheel 58 has three fingers 70 which are spaced apart the same angular distance as the teeth on the ratchet wheel 63 and are shaped to engage the work to be broached. These fingers sweep over the bottom plate 29 to remove the finished piece of work and to place a new piece of work in position to be broached each time that the piston 68 is advanced.

In order to allow the finished work to be removed and a new piece of work placed in position to be broached, the nose 18 of the tool 19 is advanced through the work and into the socket 17 before each working stroke and withdrawn after each working stroke.

The tool 19 is supported at its upper end by a socket 71 which has spring detents 72 arranged therein to engage a groove 73 formed in the tool, and the socket 71 is held against lateral movement by a slotted shoe 74 which is secured to its rear side and guided between the inner edges of the guide plates 34.

The socket 71 is secured to the rod 75 of a piston 76 which is fitted in a cylinder 77 arranged within and carried by an extension 78 of the frame 10.

When liquid is delivered to the upper end of the cylinder 77, the tool 19 will be advanced into the socket 17 and, when the tool is secured in the socket 17 and liquid is delivered to the lower end of the cylinder 77, the socket 71 will be retracted and the detents 72 pulled out of the groove 73.

When liquid is next delivered to the cylinder 77 to advance the piston 76, the socket 71 will be forced over the end of the broaching tool and the detents 72 will re-engage the groove 73. Then when the locking bar 22 is retracted to release the broaching tool and liquid is again delivered to the cylinder 77 to retract the piston 76, the broaching tool will be drawn upwardly out of the socket 17.

The tool locking piston 25, the pump regulating piston 56, the work handling piston 68, and the tool handling piston 76 are all automatically operated in a predetermined sequence and the cylinders in which these pistons are fitted are connected into a hydraulic circuit such as that shown in Fig. 5.

Liquid is delivered into this circuit by a gear pump 79 which draws its supply of liquid, such as oil, from a reservoir 60 and discharges it into a pipe 81 which is connected to the forward ends of the cylinders 69 and 77 through branch pipes 82 and 83, so that the pistons 68 and 76 are supported by this liquid in the positions shown in Fig. 5.

The pressure of the liquid delivered by the pump 79 is limited by a relief valve 84 which is connected to the pipe 81 and exhausts through a drain pipe 85 into the reservoir 80.

Communication between the supply pipe 81 and the rear ends of the cylinders 69 and 77 is controlled by a valve 86 which is carried by the frame 10 and has three heads 87, 88 and 89 spaced along its plunger 90.

The valve 86 is connected to the pipe 81 intermediate the ends thereof by a pipe 91 which is open at all times to the space between the heads 87 and 88.

A pipe 92 has one of its ends connected to the rear end of the cylinder 69 and its other end connected to the valve 86 and controlled by the head 87. A pipe 93 has one of its ends connected to the rear end of the cylinder 77 and its other end connected to the cylinder 69 intermediate the ends thereof and controlled by the piston 68. A check valve 94 connected between the pipes 92 and 93 permits liquid to flow freely from the pipe 93 to the pipe 92 but prevents it from flowing in the opposite direction.

The control valve plunger 90 is urged forwardly or to the left in respect to Fig. 5 by a compression spring 95 which abuts the end of the valve cylinder and acts upon the head 89, and the plunger 90 is allowed to reciprocate freely by the ends of the valve cylinder being open at all times to an exhaust pipe 96 which discharges into the sump of the pump 37.

The stem of the plunger 90 is connected by a link 97 to one arm of a control lever 98 which is journaled intermediate its ends upon a trunnion 99 carried by the frame 10.

The control lever 98 has an operating handle 100 connected thereto intermediate its ends, and its other arm has its free end 101 notched for engagement with a detent pin 102 which is guided in two lugs 103 carried by the frame 10.

The detent pin 102 is operated and controlled by a hand lever 104 which is journaled intermediate its ends upon a trunnion 105 carried by the frame 10, and the lever 104 is connected intermediate its ends to the detent pin 102 by a pin and slot connection 106. The lever 104 and the detent pin 102 are urged upwardly toward the control lever 98 by a compression spring 107 which encircles the detent pin 102 between the lever 104 and the lower lug 103.

When the detent pin 102 is in engagement with the end 101 of the control lever 98, it holds the control valve plunger 90 in the position shown in Fig. 5, and the pipe 91 is blocked from the pipe 92 and the pipe 92 is open to the exhaust pipe 96. Consequently, there is no pressure in the rear ends of the cylinders 69 and 77, and the pistons 68 and 76 are held in their uppermost positions by liquid pressure transmitted to the forward ends of the cylinders from the pump 79 through the pipe 81 and the branch pipes 82 and 83.

Figures 1, 6, 7, 8:
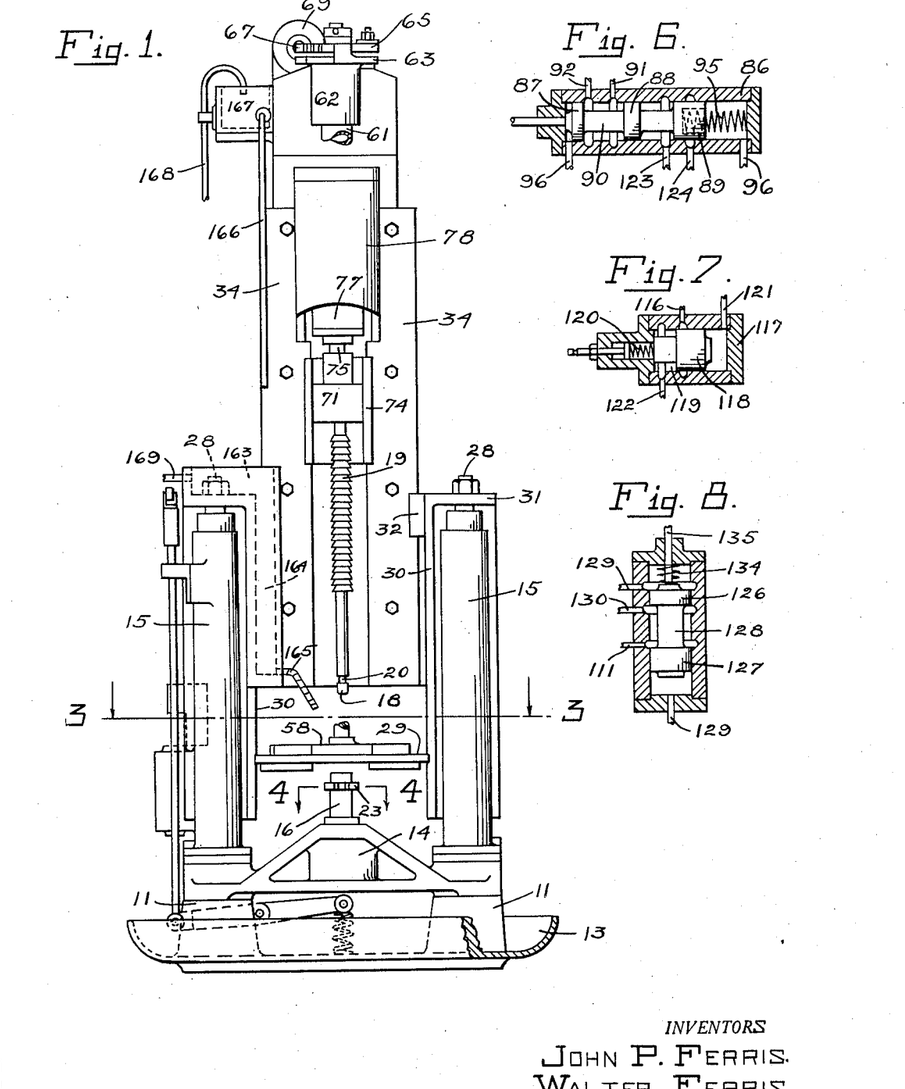
Fig. 1 is a front view of the machine, part of the feed mechanism being omitted in order to expose the broaching tool.
Figs. 6, 7 and 8 are longitudinal sections through certain valves and show the plungers thereof in different positions from those shown in Fig. 5.
Figure 2:
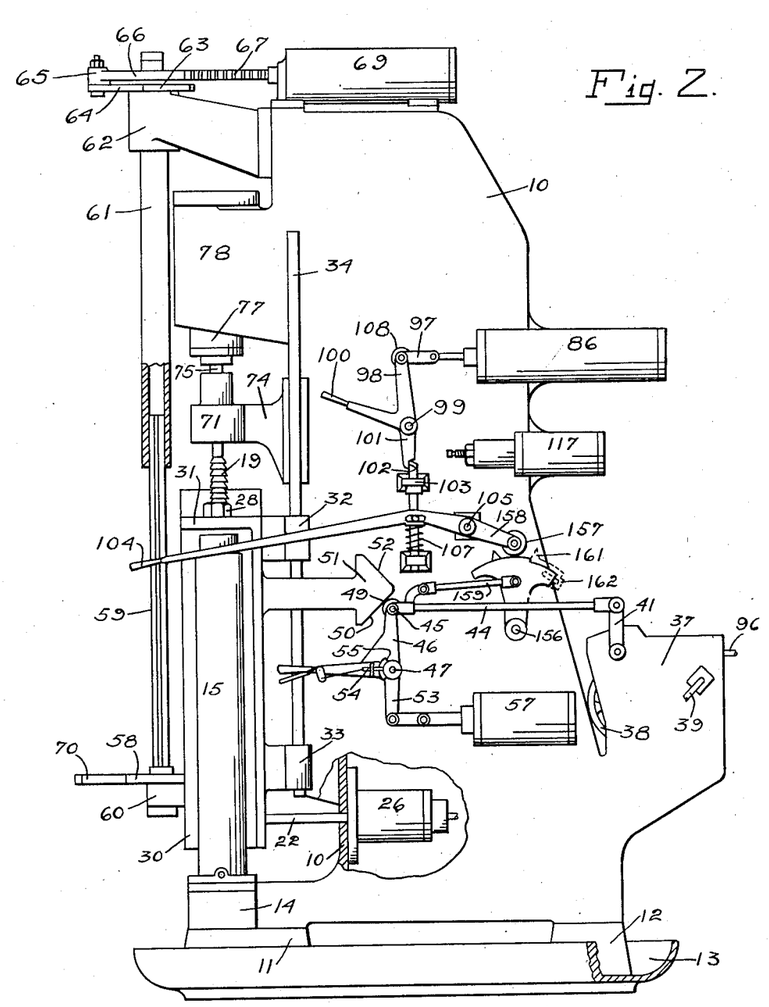
Fig. 2 is a side view partly in section.

Upon depressing the hand lever 104, the detent pin 102 is disengaged from the end 101 of the lever 98 and the control valve plunger 90 is advanced by the spring 95 into the position shown in Fig. 6.

The pipe 92 is then blocked from the exhaust pipe 96 and opened to the pressure pipe 91, and pressure is transmitted to the rear end of the cylinder 69. The rear face of the piston 68 has a greater effective cross sectional area than the front face thereof due to the displacement of the piston rod, and the piston 68 advances under the greater total pressure applied to its rear face to thereby rotate the star wheel 58 through an angle of 120°.

As the piston 68 reaches the forward limit of its stroke, it opens the pipe 93 to the pipe 92 and liquid flows through the cylinder 69 and the pipe 93 to the rear end of the cylinder 77.

Due to the displacement of the piston rod 75, the liquid supplied to the rear end of the cylinder 77 exerts a greater total force upon the rear end of the piston 76 than is exerted upon the front face thereof by the liquid supplied to the front end of the cylinder 77. Consequently, the liquid supplied to the rear end of the cylinder 77 advances the piston 76, and the nose 18 of the broaching tool 19 is passed through the work "A" and into the socket 17.

With this arrangement, the broaching tool cannot be advanced into engagement with the draw head until the feeding mechanism has been operated.

Both of the pistons 68 and 76 remain in their advanced positions until the control valve plunger 90 is returned to the position shown in Fig. 5. The plunger is returned either manually by manipulating the handle 100 of the control lever 98 or automatically by a roller 108 on the upper end of the control lever 98 being engaged by the face 52 of the cam 51 as the work support approaches the upper end of its working stroke.

When the control valve plunger 90 is returned either manually or automatically to the position shown in Fig. 5, the detent pin 102 automatically engages the end 101 of the control lever 98 and retains it in this position against the action of the spring 95.

The return of the valve plunger 90 to this position reopens the rear end of the cylinder 69 to the exhaust pipe 96 through the pipe 92 and also reopens the rear end of the cylinder 77 to the exhaust pipe 96 through the pipe 93, the check valve 94 and the pipe 92, and both of the pistons 68 and 76 are returned to their retracted positions by liquid delivered to the forward ends of the cylinders 69 and 77 through the pressure pipe 81 and the branch pipes 82 and 83.

The tool locking piston 25 and the pump regulating piston 56 are operated by liquid delivered to their cylinders 26 and 57 by a second gear pump 109 which draws its supply of liquid from a reservoir 110 and discharges it through a supply pipe 111.

The pressure of the liquid delivered by the pump 109 is limited by a relief valve 112 which is connected to the pipe 111 and discharges through an exhaust pipe 113 into the reservoir 110.

The pipe 111 is permanently connected to the forward end of the cylinder 57 through a pipe 114 and to the forward end of the cylinder 26 through a pipe 115.

The cylinder 57 is connected intermediate its ends by a pipe 116 to a cutoff valve 117, and communication between the pipe 116 and the pipe 114 is controlled by the pump regulating piston 56.

The cutoff valve 117 has a plunger 118 arranged in its bore 119 and urged by a spring 120 to the position shown in Fig. 5, and the plunger 118 is adapted to be urged to the left against the action of the spring 120 by liquid supplied through a pipe 121 which has one end connected to the rear end of the bore 119 and its other end connected to the pipe 93.

The plunger 118 controls communication between the pipe 116 and a pipe 122 which connects the left end of the bore 119 to the exhaust pipe 96.

The pipe 116 is connected intermediate its ends to the valve 86 by a pipe 123 which is open at all times to the space between the heads 88 and 89 on the plunger 90 and, when the plunger 90 is in the position shown in Fig. 5, this space is open to the exhaust pipe 96 through a pipe 124 and no pressure can be maintained in the pipe 116. When the plunger 90 is moved to the position shown in Fig. 6, the head 89 blocks the pipe 124 and pressure may then be created in the pipe 116.

The supply pipe 111 is connected also to a valve 125 which is ordinarily arranged upon the left side of the frame 10 and has two heads 126 and 127 formed upon its plunger 128 upon opposite sides of the point at which the pipe 111 is connected.

The ends of the valve 125 are connected to a drain pipe 129 which exhausts through the drain pipe 113 into the reservoir 110, and a pipe 130 has one of its ends connected to the rear end of the locking cylinder 26 and its other end connected to the valve 125 and controlled by the head 126.

When the plunger 128 is advanced into the position shown in Fig. 8, liquid from the pump 109 may flow through the pipe 111, the valve 125 and the pipe 130 to the right end of the cylinder 26 and advance its piston 25, and then flow to the rear end of the pump control cylinder 57 through a pipe 131 which has one of its ends connected to the rear end of the cylinder 57 and its other end connected to the cylinder 26 intermediate the ends thereof and controlled by the piston 25.

A check valve 132 connected between the pipe 131 and the pipe 130 allows liquid to flow from the pipe 131 to the pipe 130 but prevents flow in the opposite direction, and a check valve 133 connected between the pipe 131 and the drain pipe 113 allows liquid to flow from the drain pipe 113 to the pipe 131 but prevents flow in the opposite direction.

The plunger 128 of the valve 125 is urged downwardly by a helical compression spring 134 which is arranged between the upper side of the head 126 and the upper end of the valve cylinder.

The plunger 128 is adapted to be raised against the resistance of the spring 134 into the position shown in Fig. 8 and held in that position during a predetermined part of each cycle of operation by a stem 135 which is guided for vertical reciprocation within a bracket 136 carried by the frame 10.

The upper end of the stem 135 is provided with a head 137 to engage a pawl 138 which is pivoted by a pin 139 to a block 140 carried upon the upper end of a vertical rod 141. The pawl 138 is urged into vertical alinement with the head 137 by a compression spring 142 which is arranged between the pawl 138 and the block 140, and the outward movement of the pawl 138 is limited by a stop 143 arranged upon its lower end to engage the lower part of the block 140.

The rod 141 is guided by the bracket 136 and has its lower end connected to a lever 144 which is pivoted intermediate its ends upon a stationary pin 145 carried by a pedestal 11.

The other end of the lever 144 carries a pin 146 which is urged upwardly into the socket 17 by a compression spring 147, and this upward movement is limited by a stop collar 148 which is secured upon the pin 146 and abuts the bottom of the drawhead 16.

The pawl 138 is provided with an arm 149 which has a roller 150 journaled upon the outer end thereof and arranged in the path of a cam 151 carried by the work support.

When the nose 18 of the tool 19 enters the socket 17, it depresses the pin 146 and rocks the lever 144, thereby elevating the pawl 138 and moving the plunger 128 of the valve 125 into the position shown in Fig. 8.

The plunger 128 is retained in this position until the work support approaches the upper end of its stroke and then the cam 151 engages the roller 150 and trips the pawl 138, thereby releasing the head 137 and allowing the spring 134 to return the plunger 128 to its initial position.

When the nose 18 of the tool 19 is removed from the socket 17, the pin 146 reenters the socket 17 and the block 140 moves downwardly and the pawl 138 reengages the head 137.

When the machine is idle, the valve plungers and the motor pistons are in the positions shown in Fig. 5 and are being held in those positions in the manner previously described.

Figure 3:
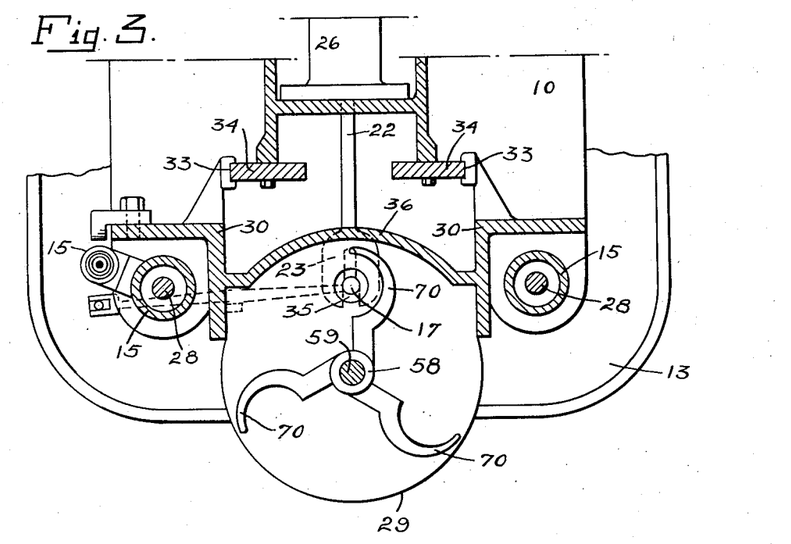
Fig. 3 is a sectional plan view taken on the line 3—3 of Fig. 1.

If a piece of work is placed within the curvature of the finger 70 shown at the right of Fig. 3 and the hand lever 104 is depressed, the machine will operate as follows:

The handle 104 withdraws the detent pin 102 from engagement with the notched end 101 of the control lever 98 and the spring 95 moves the plunger 90 of the control valve 86 to the position shown in Fig. 6.

The pipe 92 is now open to the pipe 91 and liquid from the pump 79 enters the rear end of the cylinder 69 and advances the piston 68, thereby operating the feeding mechanism and moving the work over the opening 35 in the bottom plate 29 into position to be broached.

When the piston 68 reaches the limit of its forward movement, it uncovers the pipe 93 and liquid flows through the cylinder 69 and the pipe 93 to the rear end of the cylinder 77, and from the pipe 93 through the pipe 121 to the rear end of the cylinder 117.

The liquid entering the rear end of the cylinder 77 advances the piston 76 and passes the nose 18 of the broaching tool 19 through the work and into the socket 17, and the liquid entering the cylinder 117 advances the piston 118 which closes the end of the pipe 116 so that the pump 109 creates pressure in the pipes 111, 114, 115, 116 and 123 and in the forward ends of the cylinders 26 and 57.

As the nose 18 of the tool 19 enters the socket 17, it depresses the pin 146 and thereby raises the plunger 128 of the valve 125 and, when the tool 19 reaches the limit of its downward movement, the groove 20 is in alinement with the head 23 of the locking bar 22 and the plunger 128 has opened the pipe 111 to the pipe 130.

If the nose of the tool 19 fails to enter the socket 17 far enough to bring the groove 20 into alinement with the locking head 23, as by chips or other obstructions limiting its downward movement, the pin 146 is not depressed far enough to raise the valve plunger 128 sufficiently to open the pipe 130 to the supply pipe 111 and the machine comes to rest.

When the valve plunger 128 has been raised to its upper position, liquid from the pump 109 flows through the pipe 111, the valve 125 and the pipe 130 to the rear end of the locking cylinder 26 and, as the rear end of the piston 25 has a greater effective area than the front end thereof, the liquid forces the piston 25 and the locking bar 22 forwardly to lock the tool 19 to the drawhead 16.

As the piston 25 reaches the limit of its forward movement, it opens communication between the pipe 130 and the pipe 131 and liquid flows through the pipe 131 to the rear end of the cylinder 57 and moves the piston 56 forwardly, due to the rear end of the piston 56 having a greater effective cross sectional area than the forward end thereof.

The forward movement of the piston 56 is transmitted through the levers 53 and 46 and the link 44 to the control lever 41 which is moved to the right and the pump 37 delivers liquid through the pipes 39 and 42 to the bottom ends of the cylinders 15.

The liquid entering the bottom ends of the cylinders 15 moves the pistons 27 upwardly and thereby raises the work support which moves the work "A" upwardly over the broaching tool 19 to broach the same.

The work support cannot be moved upwardly until the tool is locked to the drawhead as the piston 25 controls the delivery of liquid to the pump control motor 57, and the locking mechanism cannot be actuated until the broaching tool is in position to be locked to the drawhead as the valve plunger 128 controls the delivery of liquid to the locking cylinder 26.

During the upward movement of the work support, the face 52 on the cam 51 engages the roller 108 and moves the plunger 90 of the control valve 86 to its initial position, and the detent pin 102 engages the notched end 101 of the control lever 98 and secures the plunger 90 in this position.

The pipe 92 is now open to the exhaust pipe 96 and the liquid delivered by the pump 79 through the pipe 81 and the branch pipes 82 and 83 to the forward ends of the cylinders 69 and 77 retracts the pistons 68 and 76. The liquid in the rear end of the cylinder 69 is exhausted through the pipe 92 and the valve 86 to the exhaust pipe 96, and the liquid in the rear end of the cylinder 77 is exhausted through the pipe 93, the check valve 94, the pipe 92 and the valve 86 to the exhaust pipe 96.

The rear end of the shutoff valve 117 is also open to the exhaust pipe 96 through the pipes 121 and 93, the check valve 94, the pipe 92 and the valve 86, and the spring 120 returns the plunger 118 to its initial position.

As the piston 68 retracts, it rotates the segmental gear 66, and the arm 65 moves the pawl 64 behind the next tooth on the ratchet wheel 63 in position to rotate the ratchet wheel 63 and the star wheel 58 another step forwardly when the piston 68 is again advanced.

The upward movement of the piston 76 pulls the spring detents 72 clear of the groove 73 and raises the socket 71 clear of the upper end of the broaching tool 19 to allow the work "A" to pass upwardly clear of the broaching tool.

As the work support approaches the limit of its upward movement, the cam 151 engages the roller 150 and swings the pawl 138 out of engagement with the head 137 to allow the spring 134 to return the plunger 128 of the valve 125 to its initial position.

Returning the plunger 128 to its initial position, opens the pipes 130 and 131 to the drain pipe 129 and the liquid delivered by the pump 109 through the pipes 111, 114 and 115 to the forward ends of the cylinder 57 and 26 returns the plungers 56 and 25 to their initial positions. The liquid in the rear end of the cylinder 25 is exhausted through the pipe 130 and the valve 125 to the drain pipe 129, and the liquid in the rear end of the cylinder 57 is exhausted through the pipe 131, the check valve 132, the pipe 130 and the valve 125 to the drain pipe 129.

When the piston 56 reaches the position shown in Fig. 5, it uncovers the end of the pipe 116 and the liquid delivered by the pump 109 flows through the pipes 111 and 114, the cylinder 57, the pipe 116, the shutoff valve 117 and the pipe 122 to the exhaust pipe 96, and the piston 56 remains in the position shown in Fig. 5.

Returning the piston 25 to its initial position withdraws the locking bar 22 from engagement with the tool 19, and returning the piston 56 to its intial position returns the control lever 41 to its neutral position and the pump 37 ceases to deliver liquid, thereby bringing the work support 29 to rest.

The hand lever 104 is then depressed again and the plunger 90 of the valve 86 moves into the position shown in Fig. 6 and opens the pipe 92 to the pipe 91 to allow the pump 79 to deliver liquid to the rear end of the cylinder 69 and advance the piston 68, as previously described.

The forward movement of the piston 68 operates the feeding mechanism to move the piece of finished work out of alinement with the tool 19 and, when the piston 68 reaches the limit of its forward movement, it opens the pipe 92 to the pipe 93 and liquid is delivered to the rear end of the cylinder 77 to advance the socket 71 into engagement with the broaching tool 19 and to the rear end of the shutoff valve 117 to advance its piston 118 and close communication between the pipe 116 and the exhaust pipe 122.

When the piston 118 closes the end of the pipe 116, pressure rises in the pipes 111, 114 and 116 and the liquid delivered to the front end of the cylinder 57 forces the plunger 56 to the right and moves the control lever 41 to the left to cause the pump 37 to deliver liquid through the pipe 40 and the branch pipes 43 to the upper ends of the cylinders 15, the liquid in the rear end of the cylinder 57 being exhausted through the pipe 131, the check valve 132, the pipe 130 and the valve 125 to the drain pipe 129.

The liquid delivered to the upper ends of the cylinders 15 moves the work support downwardly and, during its downward movement, the face 50 on the cam 51 engages the roller 108 and moves the plunger 90 of the control valve 86 to its initial position in which it is secured by the detent pin 102 engaging the notched end 101 of the control lever 98.

As the plunger 90 reaches its initial position, it opens the pipe 92 to the exhaust pipe 96 and the pistons 68 and 76 are retracted as previously described.

The piston 68 operates the ratchet mechanism and moves the pawl 64 behind the next tooth on the ratchet wheel 63, and the piston 76 raises the broaching tool clear of the drawhead 16.

The work support continues to move downwardly and, as it approaches the limit of its downward movement, the face 50 on the cam 51 engages the roller 49 and moves the control lever 41 to its neutral position so that the pump 37 ceases to deliver liquid and the machine comes to rest with the several parts thereof in position to start a second cycle of operation.

In the operation described above, the work support comes to rest at each end of its stroke and manual operation of the hand lever 104 is required to restart the machine. However, mechanism is provided which enables the operator to adjust the machine so that it will complete a single cycle or successive cycles of operation without coming to rest.

This mechanism includes a quadrant 155 having its lower end pivoted upon a trunnion 156 carried by the frame 10 in a stationary position and its upper edge engaged by a roller 157 carried by an extension 158 of the hand lever 104.

The quadrant 155 is connected by a link 159 to the link 44 so that it is rocked upon the trunnion 156 in unison with the movement of the control lever 41, and it is provided upon its upper edge with two cams 160 and 161 which are arranged upon opposite sides of the roller 157.

The cam 160 is so positioned that it will pass to the right of the roller 157 when the pump control lever 41 is shifted to the right to start the work support upwardly. Then, when the lever 41 is returned to its neutral position to stop the work support at the upper end of its stroke, the cam 160 passes beneath the roller 157 and thereby elevates it and depresses the lever 104 to release the control lever 98 and cause the work support to start on its downward stroke.

The cam 161 is secured to the quadrant 155 by a screw 162 in such position that it will pass to the left of the roller 157 when the control lever 41 moves to the left to lower the work support and, when the control lever 41 is returned to its initial position to stop the downward movement of the work support, the cam 161 will raise the roller 157 and thereby start another cycle of operation.

If only the cam 160 is employed, the machine will complete a cycle of operation and come to rest with the work support 29 in its lower position.

If both of the cams 160 and 161 are employed, the machine will continue to operate and the cycles will follow each other in succession until the machine is brought to rest by manipulating the handle 48 which may also be manipulated at any point in a cycle of operation to start, stop or reverse the movement of the work support.

The operator may thus assume control of the machine at any point in any cycle of operation.

In order to provide lubricant to the tool during the cutting stroke, a reservoir 163 is arranged upon the top of one side member 30 of the work support and provided with a depressed part 164 which extends downwardly along the inside of the member 30 and has a discharge pipe 165 connected to its lower end for directing liquid onto the tool and the work.

Lubricant is supplied to the reservoir 163 through a pipe 166 from a supply tank 167 which is arranged upon the top of the frame 10 and supplied with lubricant pumped from the base 13 through a pipe 168.

The pipe 166 terminates at a point adjacent the reservoir 163 when the work support is in its lower position and, as the work support rises during a cutting stroke, the pipe 166 enters the depressed part 164. The depressed part 164 will therefore perform the dual function of accommodating the pipe 166 during the upstroke of the work support and allowing a sufficient head of liquid to be maintained in the reservoir 163 to insure an ample flow of liquid through the discharge pipe 165.

The level of the liquid in the reservoir 163 is limited by an overflow pipe 169 which exhausts into the base 13.

The invention herein set forth is susceptible of various modifications and adaptations without departing from the scope thereof as hereafter claimed.

The invention is hereby claimed as follows:

1. In a broaching machine having a draw head, a work support, and power drive for producing relative reciprocation between said work support and said draw head, the combination of power means for securing a broaching tool to said draw head, and means responsive to the operation of said tool securing means for controlling said power drive.

2. In a broaching machine having a draw head, a work support, and power means for producing relative reciprocation between said work support and said draw head, the combination of means for securing a broaching tool to said draw head, and a piston and a cylinder functioning as a motor to operate said tool securing means and as a valve to control said power means.

3. In a broaching machine having a draw head, a work support, and power means for producing relative reciprocation between said work support and said draw head, the combination of a locking bar for securing a broaching tool to said draw head, and a hydraulic motor having its piston connected to said locking bar to operate the same and its piston and cylinder functioning as a valve to control said power means.

4. In a broaching machine having a draw head, a work support, a hydraulic driving motor for producing relative reciprocation between said work support and said draw head, and a pump for supplying driving liquid to said motor, the combination of means for securing a broaching tool to said draw head, and a piston and a cylinder functioning as a valve to control the delivery of liquid to said motor and as a motor to operate said tool securing means.

5. In a broaching machine having a draw head, a work support, a hydraulic driving motor for producing relative reciprocation between said work support and said draw head, and a pump for supplying driving liquid to said motor, the combination of a locking bar for securing a broaching tool to said draw head, and a hydraulic locking motor having its piston connected to said locking bar to operate the same and its piston and cylinder functioning as a valve to control the delivery of liquid to said driving motor.

6. In a broaching machine having a draw head, a work support, a hydraulic driving motor for producing relative reciprocation between said work support and said draw head, and a variable delivery pump for supplying driving liquid to said motor, the combination of a hydraulic motor for changing the stroke of said pump between zero and a predetermined maximum, means for securing a broaching tool to said draw head, and a piston and a cylinder functioning as a valve to control the delivery of liquid to said stroke changing motor and as a motor to operate said tool securing means.

7. In a broaching machine, the combination of a draw head for receiving the nose of a broaching tool, a work support, driving means for effecting relative reciprocation between said draw head and said work support, means for controlling said driving means, and means operated by the entry of the nose of said broaching tool into said draw head for effecting operation of said control means.

8. In a broaching machine, the combination of a draw head for receiving the nose of a broaching tool, a work support, driving means for effecting relative reciprocation between said draw head and said work support, means responsive to the entry of the nose of said broaching tool into said draw head for securing the same therein, and means responsive to the action of said securing means for rendering said driving means active.

9. In a broaching machine, the combination of a draw head having a socket to receive the nose of a broaching tool, a locking bar movable transversely of said socket, means for reciprocating said locking bar, and means responsive to the entry of the nose of the broaching tool into said socket for causing the aforesaid means to advance said locking bar to lock said broaching tool to said draw head.

10. In a broaching machine, the combination of a draw head having a socket to receive the nose of a broaching tool, a locking bar movable transversely of said socket, a hydraulic motor for operating said locking bar, and means responsive to the entry of the nose of the broaching tool into said socket to actuate said motor and cause it to advance said locking bar to lock said broaching tool to said draw head.

11. In a broaching machine, the combination of a draw head having a socket to receive the nose of a broaching tool and transverse slots intersecting said socket, a bifurcated locking bar movable in said slots transversely of said socket, and means responsive to the entry of the nose of the broaching tool into said socket to advance said locking bar to lock said broaching tool to said draw head.

12. In a broaching machine, the combination of a draw head having a socket to receive the nose of a broaching tool and transverse slots intersecting said socket, a bifurcated locking bar movable in said slots transversely of said socket, a hydraulic motor for operating said locking bar, and means responsive to the entry of the nose of the broaching tool into said socket to actuate said motor and cause it to advance said locking bar to lock said broaching tool to said draw head.

13. In a broaching machine having a draw head for receiving the nose of a broaching tool, a work support and hydraulic driving means for effecting relative reciprocation between said draw head and said work support to effect a cutting stroke, the combination of means for securing said broaching tool to said draw head, hydraulic means for operating said securing means, and means responsive to the entry of the nose of said broaching tool into said drawhead for effecting operation of said hydraulic means and then starting said driving means.

14. In a broaching machine having a draw head for receiving the nose of a broaching tool, a work support, and hydraulic driving means for effecting relative reciprocation between said draw head and said work support to effect a cutting stroke, the combination of means for securing said broaching tool to said draw head, and a piston and a cylinder operated in response to the entry of the nose of said tool into said draw head and functioning as a motor for operating said tool securing means and as a valve for controlling said driving means.

15. A broaching machine, comprising a draw head, a work support, power means for producing relative reciprocation between said draw head and said work support to effect a cutting stroke, a feed for moving pieces of work into position to be broached, means for operating said feed, tool handling means operated automatically in sequence with said feed operating means for moving a broaching tool into engagement with said draw head, means operated automatically in sequence with said tool handling means for securing said tool to said draw head, and means operated automatically in sequence with said tool securing means for initiating a cutting stroke.

16. A broaching machine, comprising a draw head, a work support, hydraulic motors for producing relative reciprocation between said draw head and said work support to effect a cutting stroke, a mechanical feed for moving pieces of work into position to be broached, a hydraulic motor for operating said feed, a hydraulic motor connected in series with said feed motor and having a releasable clutch for carrying a broaching tool and operable to handle a tool to and from said draw head, means for locking said tool to said draw head, a hydraulic motor for operating said locking means, a cylinder connected in series with said locking motor, and a piston arranged in said cylinder and operated by liquid from said locking motor to initiate a cutting stroke.

17. A broaching machine, comprising a draw head, a work support, power means for producing relative reciprocation between said draw head and said work support to effect a cutting stroke, a feed for moving pieces of work into position to be broached, means for operating said feed, tool handling means operated automatically in sequence with said feed operating means for moving a broaching tool into engagement with said draw head, means operated automatically in sequence with said tool handling means for securing said tool to said draw head, means operated automatically in sequence with said tool securing means for initiating a cutting stroke, and means for automatically removing the work from broaching position at the end of a cutting stroke and returning the several parts of the machine to their initial positions.

18. A broaching machine, comprising a draw head, a work support, hydraulic motors for producing relative reciprocation between said draw head and said work support to effect a cutting stroke, a mechanical feed for moving pieces of work into position to be broached, a hydraulic motor for operating said feed, a hydraulic motor connected in series with said feed motor and having a releasable clutch for carrying a broaching tool and operable to handle a tool to and from said draw head, means for locking said tool to said draw head, a hydraulic motor for operating said securing means, a cylinder connected in series with said locking motor, a piston arranged in said cylinder and operated by liquid from said locking motor to initiate a cutting stroke, and means for automatically removing the work from broaching position at the end of a cutting stroke and returning the several parts of the machine to their initial positions.

19. A broaching machine, comprising a draw head, a work support, power means for effecting relative reciprocation between said draw head and said work support, tool handling means for moving a broaching tool into and out of engagement with said draw head, means operated automatically in sequence with said tool handling means for securing said tool to said draw head, means operated in response to the operation of said tool securing means for effecting operation of said power means, and control mechanism responsive to relative movement between said draw head and said work support for controlling the operation of said machine and adjustable to cause said machine to come to rest at the end of each reciprocation effected by said power means or to operate continuously.

20. A broaching machine, comprising a draw head, a work support, a hydraulic motor for producing relative reciprocation between said draw head and said work support, a pump for supplying liquid to said motor to operate the same, tool handling means for moving a broaching tool into and out of engagement with said draw head, means operated automatically in sequence with said tool handling means for securing said tool to said draw head, a hydraulic motor operated automatically in sequence with said tool securing means for controlling said pump, and control mechanism responsive to relative movement between said draw head and said work support and alternatively operable to cause said machine to come to rest at the end of each reciprocation or to operate continuously.

JOHN P. FERRIS.
WALTER FERRIS.